Oct. 15, 1963 D. M. DUNKLEE ET AL 3,107,110
SWIVEL HOSE CLOSURE
Filed Nov. 24, 1961
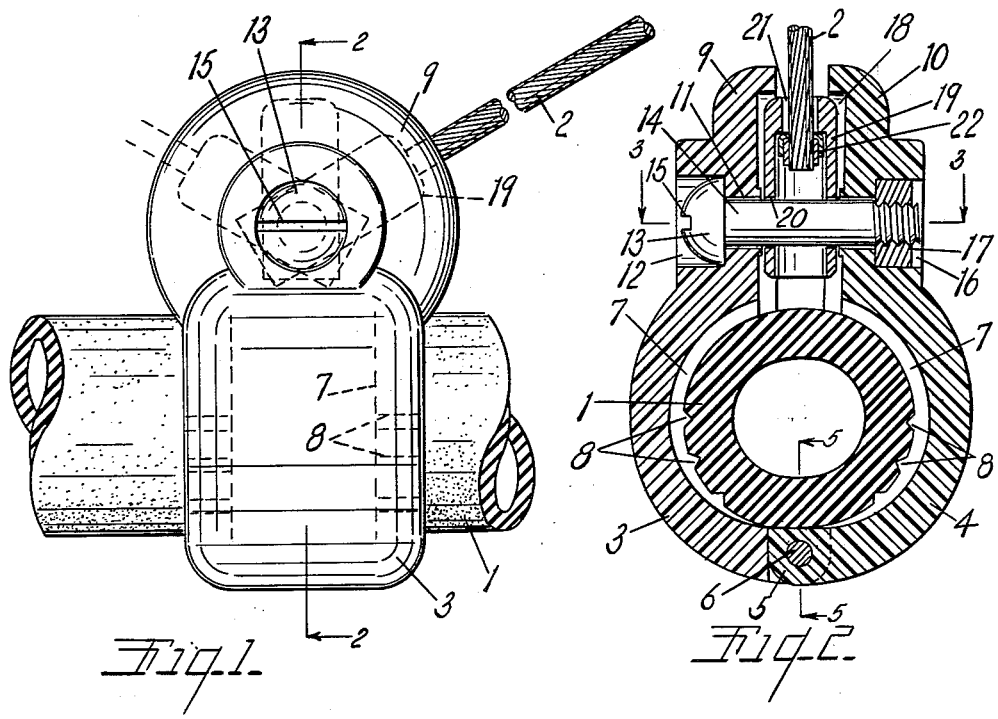
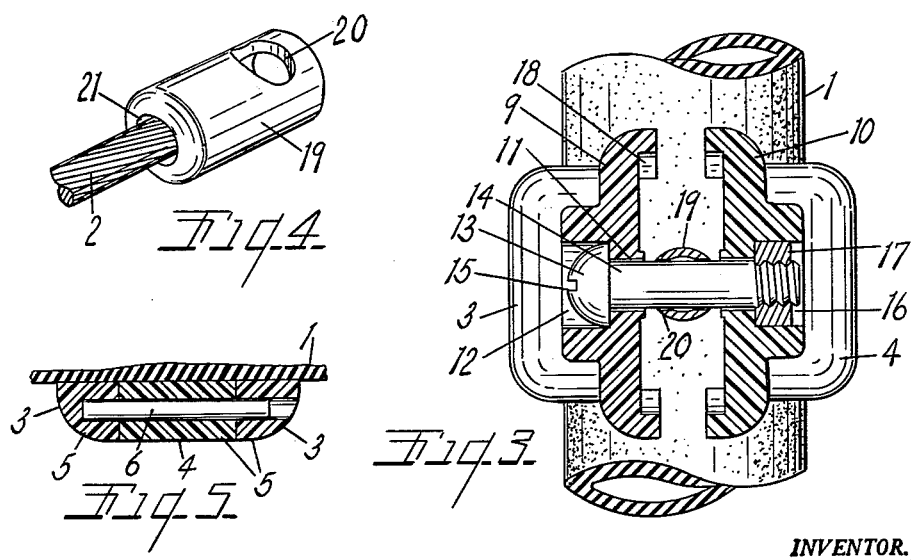
INVENTOR.
Donovan M. Dunklee
Charles Ganzel
BY
ATTORNEY

3,107,110
SWIVEL HOSE CLOSURE
Donovan M. Dunklee, Plainwell, and Charles Ganzel, Richland, Mich., assignors to Walwood Products, Doster, Mich., a partnership
Filed Nov. 24, 1961, Ser. No. 154,746
2 Claims. (Cl. 287—92)

This invention relates to dispensing hose and retracting cable coupling means. The main objects of this invention are, First, to provide a swivel coupling means for cable and dispensing hose with relatively few parts, and one in which the movable parts are effectively housed while permitting swiveling and a wide range of tilting or swinging movement.

Second, to provide a coupling means embodying these advantages in which the body portion may be formed of molded non-metallic material.

Third, to provide a coupling means for a cable to a flexible hose in which the parts may be economically produced and at the same time are strong, durable and attractive in appearance, and one in which there are relatively few parts and which may be readily applied or adjusted.

Objects relating to details and economies of the invention will appear from the description to follow. The invention is defined and pointed out in the claims.

A preferred embodiment of the invention is illustrated in the accompanying drawing, in which:

FIG. 1 is a fragmentary side elevational view of a structure embodying our invention, fragments only of the hose and cable being illustrated.

FIG. 2 is a cross sectional view on a line corresponding to line 2—2 of FIG. 1, the bolt being shown in full lines.

FIG. 3 is a transverse section on a line corresponding to line 3—3 of FIG. 2, the bolt being shown in full lines.

FIG. 4 is a fragmentary perspective view of the cable coupling member, a fragment only of cable being illustrated.

FIG. 5 is a fragmentary view in section on a line corresponding to line 5—5 of FIG. 2.

It will be understood that our invention relates to a connection for a flexible cable to a dispensing hose, such for example as are used in gasoline stations. Only a fragment of hose 1 is illustrated, but it will be understood that the device is commonly applied adjacent the dispensing nozzle and that the cable 2 is commonly connected to and automatically wound on a spring tensioned drum. The hose nozzle and the hose connection to the source are not illustrated for the reason that such parts form no part of this invention.

The coupling of the embodiment of our invention illustrated comprises the body members 3 and 4 desirably of molded non-elastic material and having interlapping pivot knuckles 5 on their inner ends connected by the pivot 6, see FIGS. 2 and 5. These body members 3 and 4 have laterally spaced inwardly facing hose-engaging ribs 7 provided with teeth 8. These ribs with their teeth provide an effective clamping engagement of the body members with the hose, preventing rotative movement relative thereto without collapsing or distorting the hose.

The body members are provided with opposed ears 9 and 10 having aligned bolt-receiving openings 11 therein. The ear 9 is provided with an outwardly facing recess 12 adapted to receive the head 13 of the bolt 14, the head being desirably provided with a screw driver receiving slot 15. The ear 10 is provided with a rectangular or non-circular recess 16 non-rotatably receiving the nut 17. The opposed inner faces of the ears 9 and 10 are, in the preferred embodiment, recessed at 18 and provide a housing for the cable coupling member 19, which is of cylindrical cross setcion and has holes 20 therein through which the bolt 14 is disposed. It has a hole 21 in its outer end through which the cable 2 is disposed, the cable having a collar 22 fixedly secured to its inner end and the collar being of a diameter exceeding that of the hole 21 so that the cable is swivelly connected to the coupling member 19. The coupling member 19 is swingably connected to the coupling body members for swinging movement between, as is indicated by dotted lines in FIG. 1.

With this arrangement of parts, there are no movable coupling parts which project from the coupling unit. The parts are simple and economical to produce and may be readily assembled. All that is necessary to do is to provide the cable with the collar 22, the collar being desirably affixed to the cable after the coupling member has been sleeved upon the cable. In the preferred embodiment, the body members 3 and 4 are formed of molded plastic material and they are provided with interlapping pivot ears to receive the pivot 6, thus providing a unitary structure which can be slipped over a hose and clampingly secured thereto in the desired position. The cable coupling member is, as stated, completely housed so that there are no moving parts of the coupling unit as such which can be obstructed by the hands or with which the hands of the user contact.

We have illustrated and described our invention in a highly practical commercial embodiment thereof. We have not attempted to illustrate other embodiments or adaptations, as it is believed that this disclosure will enable those skilled in the art to embody or adapt our invention as may be desired.

Having thus described the invention, what is claimed as new and desired to secure by Letters Patent is:

1. In combination, a flexible hose of resiliently yieldable material and a flexible cable, means for coupling the cable to said hose comprising complementary segmental body members of molded non-metallic material having opposed ears at their outer ends and interlapping pivot knuckles at their inner ends provided with a connecting pivot, said body members having laterally spaced inwardly facing hose-engaging ribs provided with teeth, said ears having bolt-receiving openings therein, a connecting bolt for said ears, a tubular cable coupling member of uniform diameter having an opening at its outer end through which said cable is disposed, there being a collar on the inner end of said cable of a diameter exceeding that of said cable-receiving opening and rotatable within the coupling member, said cable coupling member having a transverse opening therethrough at the inner side of said collar on said cable and through which said bolt is disposed whereby the cable coupling member is swingably supported between the ears of said body member and said cable is rotatably connected to and retained within said coupling member.

2. A coupling for a cable to a hose comprising complementary segmental hose embracing body members of molded non-metallic material having opposed ears at their outer ends and interlapping pivotally connected knuckles at their inner ends, said body members having laterally spaced inwardly facing hose-engaging ribs provided with teeth, said ears having bolt-receiving openings therein, a connecting bolt for said ears, a cable, a tubular cable coupling member of uniform diameter having an opening at its outer end through which said cable is disposed, there being an enlargement on the inner end of said cable of a diameter exceeding that of said cable-receiving opening and rotatable within the coupling member, said cable coupling member having a transverse opening therethrough at the inner side of said enlargement on said cable and through which said bolt is disposed whereby the cable coupling member is swingably supported and housed between the ears of said body member and said cable is rotatably connected to and retained within said coupling member.

References Cited in the file of this patent

UNITED STATES PATENTS

| | | |
|---|---|---|
| 116,848 | Manton | July 11, 1871 |
| 518,988 | Fisher | May 1, 1894 |
| 1,336,610 | Borchers | Apr. 13, 1920 |
| 1,598,385 | Ogden | Aug. 31, 1926 |
| 2,318,566 | Wright | May 4, 1943 |
| 3,006,674 | Becker | Oct. 31, 1961 |